(12) United States Patent
Dighe

(10) Patent No.: US 8,213,326 B2
(45) Date of Patent: Jul. 3, 2012

(54) METHOD AND APPARATUS FOR THE CLASSIFICATION OF PORTS ON A DATA COMMUNICATION NETWORK NODE

(75) Inventor: Sahil P Dighe, Salt Lake City, UT (US)

(73) Assignee: Alcatel Lucent, Paris (FR)

(*) Notice: Subject to any disclaimer, the term of this patent is extended or adjusted under 35 U.S.C. 154(b) by 118 days.

(21) Appl. No.: 12/387,241

(22) Filed: Apr. 30, 2009

(65) Prior Publication Data

US 2010/0278054 A1 Nov. 4, 2010

(51) Int. Cl.
*H04L 12/26* (2006.01)

(52) U.S. Cl. ......... 370/252; 370/392; 370/389; 370/255

(58) Field of Classification Search .................. 370/252, 370/255, 389, 392; 709/224, 242
See application file for complete search history.

(56) References Cited

U.S. PATENT DOCUMENTS

| | | | |
|---|---|---|---|
| 5,559,883 A * | 9/1996 | Williams | 726/13 |
| 6,324,575 B1 * | 11/2001 | Jain et al. | 709/221 |
| 7,095,719 B1 * | 8/2006 | Wilhelmsson et al. | 370/252 |
| 7,385,973 B1 * | 6/2008 | Johnson et al. | 370/389 |
| 7,885,190 B1 * | 2/2011 | Roesch et al. | 370/235 |
| 2003/0120763 A1 * | 6/2003 | Volpano | 709/223 |
| 2003/0154269 A1 * | 8/2003 | Nyanchama et al. | 709/223 |
| 2003/0223363 A1 * | 12/2003 | Sato | 370/230 |
| 2005/0091387 A1 * | 4/2005 | Abe | 709/228 |
| 2006/0235995 A1 * | 10/2006 | Bhatia et al. | 709/238 |
| 2006/0248229 A1 * | 11/2006 | Saunderson et al. | 709/245 |
| 2008/0205403 A1 * | 8/2008 | Akyol et al. | 370/392 |
| 2009/0010254 A1 * | 1/2009 | Shimada | 370/389 |

* cited by examiner

*Primary Examiner* — Ricky Ngo
*Assistant Examiner* — Rasheed Gidado
(74) *Attorney, Agent, or Firm* — Stephen Wyse

(57) ABSTRACT

A method and apparatus for classifying a port on a node in a data communications network, such as a router. The node, itself or in some embodiments though another network device, determines whether the port in question is currently receiving packets from a single address, for example a MAC address, only. If so, incoming packets of at least a first type are selected for inspection. The inspection criteria may vary with the type or types of packets selected, but in any case the results of the inspection are used to determine whether the single address corresponds with a client device. If so, selective security measures may be applied to the port. If security measures are applied to a port, the port is preferably monitored periodically to ensure that it remains a client port. The frequency of inspections or monitoring may vary depending on the port's classification history.

19 Claims, 3 Drawing Sheets

METHOD AND APPARATUS FOR THE CLASSIFICATION OF PORTS ON A DATA COMMUNICATION NETWORK NODE

TECHNICAL FIELD

The present invention relates generally to the field of communication networks, and, more particularly, to a method and apparatus for classifying ports on a data communication network node, for example a router, especially to determine whether a given port is a client port and, if so, implement security measures as appropriate.

BACKGROUND

The following abbreviations are herewith defined, at least some of which are referred to within the following description of the state-of-the-art and the present invention.

| | |
|---|---|
| ASIC | Application Specific Integrated Circuit |
| DDoS | Distributed Denial of Service |
| DHCP | Dynamic Host Configuration Protocol |
| DoS | Denial of Service |
| DUT | Device Under Test |
| IP | Internet Protocol |
| LAN | Local Area Network |
| MAC | Media Access Control |
| MAN | Metropolitan Area Network |
| PC | Personal Computer |
| SMB | Server Message Block (protocol) |
| TCAM | Ternary Content Addressable Memory |
| WAN | Wide Area Network |

Computers are electronic devices that can manipulate and store data, and they are used in a wide variety of applications. A data communication network may be used to interconnect a number of computers for the purpose of sharing data and computational resources, and to allow their respective users to communicate with each other. Data networks may be relatively small, such as a LAN, or quite large, as with MANs and WANs. These data networks may even be connected together to form internets, allowing a great many computing devices to communicate with each other. As just one example, an individual user may use their own PC, in this context referred to as a client, to access a server via a data network. The server is typically a much more powerful computing device that may be accessed by many users to, for example, send and receive email, download web pages, or access streaming audio and video presentations.

The data network includes a number, and often a large number, of nodes such as switches, bridges, and routers, and other devices that are similar or hybrids of these basic nodes. Information transmitted through the network from one computing device to another is broken up into discreet units, often called packets. Each packet is individually addressed and sequentially numbered so that it can be routed through the network to its destination, where it can be reassembled into a usable form.

Each network node has some responsibility for receiving the packets sent to it, and re-sending them according to established communication protocols, until the packets reach their destination. In this, some nodes are more sophisticated than others. Routers, for example, are capable devices that often interconnect different networks and are able to examine the address on each received packet to determine the best way to forward it toward its destination. Routers often have many ports through which they send and receive data, and therefore may be directly connected to many other devices, including clients, servers, and other routers.

In a data network, it may be advantageous to classify ports on network routers as client ports or non-client ports. Client ports are those directly connected to a client, for example a PC or a workstation. These devices are generally used by a single user, and frequently are not configured and maintained to a high security level—in contrast, for example, to a server, which is often maintained by computer professionals and equipped with sophisticated security features.

Unfortunately, this leaves client devices more vulnerable to infection by viruses. These viruses vary in nature, but generally speaking are computer programs surreptitiously installed by malicious individuals (perhaps through other computer programs) to interfere with the operation of the infected computer, or to use the infected computer to interfere with the operation of others. Examples include DoS or DDoS attacks where one or more, perhaps many, client devices are programmed by the virus to send an enormous number of requests to a server, effectively causing it to be shut down until the problem can be remedied.

Identifying a port as a client port allows the router (or the network) to implement one or more security measures. Such measures include rate-limiting or max-bandwidth limitations, or anti-spoofing programs to frustrate malicious users and their viral programs. These solutions may not be appropriate for ports connected to servers or other routers, and in many cases will be counter-productive when so applied. So security measures cannot or should not simply be implemented for all ports. A manner of classifying each port as a client port or a non-client port is therefore needed.

One way, of course is simply manual classification. This, however, requires configuration by a user and assumes either that the configuration will not need to be changed or that the user will frequently manually review the port classifications and reconfigure as needed. In another case, ports associated with link aggregation or trunk operations can often be permanently classified as non-client ports. Naturally, however, this solution is limited to those ports so associated.

Accordingly, there has been and still is a need to address the aforementioned shortcomings and other shortcomings associated with the classification of ports on a router or similar network node. These needs and other needs are satisfied by the present invention.

SUMMARY

To address the shortcomings of existing solutions, the present invention provides a manner of dynamically classifying a port on a network node, such as a router or similar device, which may be advantageously used to identify client ports. Once identified, security measures may be applied to reduce the risk of attack and enhance security.

In one aspect, the present invention is a method of classifying a port on a node in a data communication network, including determining whether the port is receiving packets from a single address, such as a MAC address and, if so, selecting packets of at least a first type from those incoming at the port, inspecting the selected packets, and determining from the inspection whether the single address corresponds to a client device. Initially determining whether the port is receiving packets form a single MAC address may be done by polling layer 2 hardware tables. The packet selection and inspection may be continued for a pre-selected training period, or may be terminated after a certain number of packets have been selected. The type of packets selected for inspection may vary according to the particular embodiment implemented, and may be limited to one or more of NetBIOS-DS (Datagram Service) packets, SMB (Server Message Block) packets, or DHCP (Dynamic Host Configuration Protocol) packets. The method is preferably repeated at predetermined intervals to ensure that the port classification remains valid. In addition, and especially when security measures have been applied to a port classified as a client port, monitoring (or additional monitoring) of incoming packets may be undertaken so that the security measures may be removed if the packets arriving at the port are from more than one source address. In some embodiments, the monitoring may be done by copying all traffic from a source IP (Internet Protocol) address not associated with the single address originally identified. In one embodiment, a TCAM (Ternary Content Addressable Memory) in the node may copy the packets from a different source IP address (for example, to a packet inspector or classification manager, or to a buffer for their use). In this embodiment, the TCAM may also be used for selecting packets for inspection prior to port classification.

In another aspect, the present invention is a method of selectively providing enhanced security in a data communication network, including determining whether a port on a network node, for example a router, is receiving packets from a single address, such a MAC address as determined by polling layer 2 hardware tables, and, if so, selecting incoming packets of at least a first type, inspecting the selected packets, determining from the inspection whether the port is a client port, and applying at least one security measure to incoming traffic on the port. The at least one security measure may be a plurality of security measures to be selectively applied based on the results of the inspection. The classification history of a port may also be taken into account when determining which security measures to apply. When security measures have been applied to a port, monitoring of incoming packets may be undertaken so that the security measures may be removed if the packets arriving at the port are from more than one source address. In some embodiments, adjustments to the security measures applied to a given port may be made. The classification may be performed entirely by the network node, or in some cases may be performed in whole or in part by another network entity. In some embodiments, a client-port classification confidence factor may be determined, the client-port classification confidence factor being a function, for example, of the type of packets inspected, the length of the training period, the interval between classifications, and so forth. The client-port classification confidence factor may be used, for example, be used as a factor in determining whether security measures should be applied.

In yet another aspect, the present invention is a network node, such as a router or similar device, including at least one port, a packet monitor for determining whether all packets being received on the at least one port are associated with a single source address, such as a MAC address, a packet selector for selecting packets for inspection if the packet monitor determines that all packets being received on the at least one port are associated with a single source address, a packet inspector for inspecting the packets selected by the packet selector, and a classification manager for classifying the at least one port based on the inspection by the packet inspector. Most network nodes have a plurality of ports, and in some embodiments of the present invention, the classification manager selects the port to be classified and when each step in the process should occur. The classification manager may also generate an instruction for applying security measures to any port classified as a client port, and may in this case instruct the port monitor to periodically monitor any port to which security measures have been applied. The network node may also include a TCAM for performing the periodic monitoring, for example by copying any incoming packets at the port (for example, copying them to the packet inspector or classification manager, or to a buffer for their use) with a source IP address different from the source IP address associated with classification of the port as a client port. In an alternate embodiment, the TCAM may also serve as the packet selector in selecting packets for inspection prior to classification. When the periodic monitoring indicates that packets are being received on the port are from more than one source address, the classification manager may also generate an instruction removing the security measures from the port.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of classifying a given router port, in particular to determine whether the port is currently a client port or a non-client port. In some embodiments, the security of the network is enhanced by implementing selected security measures for the port if and when it is determined to be a client port. These securities measures can help to prevent certain kinds of attacks from infected clients. Yet it is important that whenever avoidable, these security measured are not applied to non-client ports.

Note that the term "router" as used herein is intended to refer broadly to any network nodes in which the port classification scheme described herein may be implemented, regardless of what label is used to describe them. For example certain switches and bridge-routers may also be configured to operate according to embodiments of the present invention.

Each router may have one or more ports that connect the node to other devices in or out of the communication network. Each port may be used to receive or send packets of information to these other devices. In accordance with the present invention, ingress packets received at a given port are used to determine whether the port is a client port or a non-client port. Note that while implementation of the present invention is intended to classify ports with a high degree of accuracy, no particular degree of accuracy is required unless explicitly recited in a particular embodiment.

This classification of ports is preferably performed dynamically, that is, continually at selected intervals during actual router operation so that changes in network configuration or operation may be discovered and the security (or other) measures adjusted accordingly. The classification scheme of the present invention will now be explained in more detail.

Figure 1:
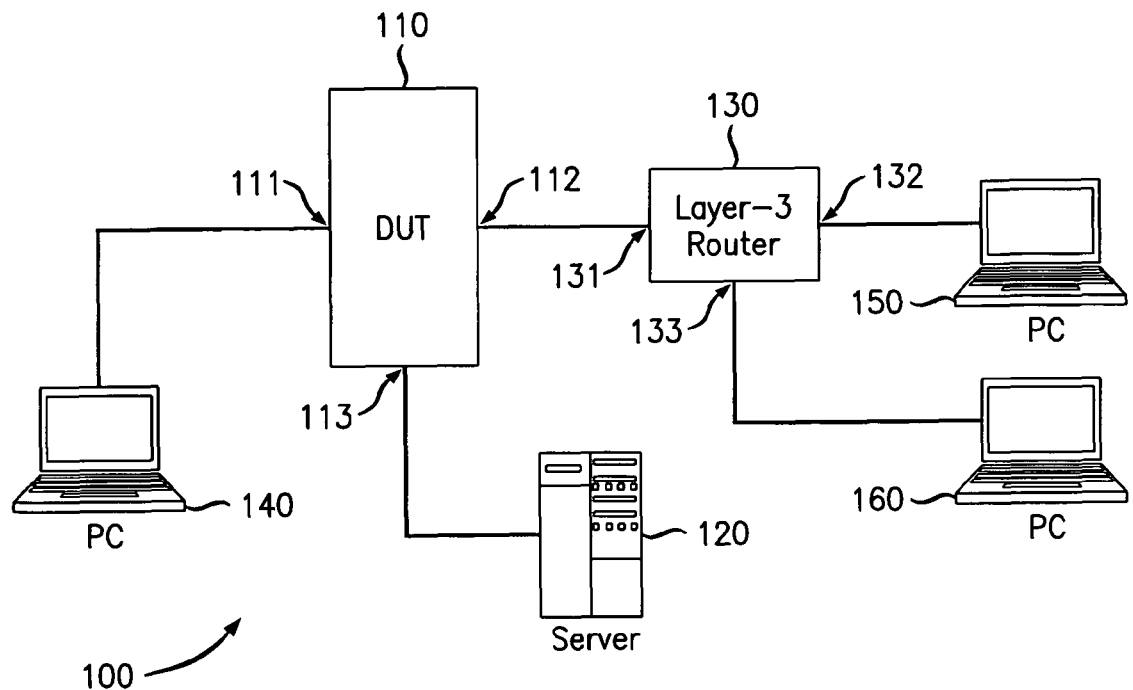
FIG. 1 is schematic diagram illustrating a network operational according to an embodiment of the present invention.

FIG. 1 is schematic diagram illustrating a network 100 operational according to an embodiment of the present invention. For convenience, in FIG. 1 network 100 includes only a small number of nodes, although most actual networks will include many more. Network 100 includes a DUT 110 that, as shown in FIG. 1, includes 3 ports referred to as 111, 112, and 113, respectively. DUT 110 may be a router, or it may be a similar device that performs a routing function, communicating data throughout network 100 by receiving data packets from, and sending them to, neighboring devices. For example, in network 100, DUT 110 communicates with server 120 on port 113. This communication may, and often does take place over a wire or cable, as implied by the line connecting port 113 of DUT 110 to server 120, but in some cases a different medium, such as a wireless channel, may also be used.

Server 120 may have many functions, including the provision of a central computing and data storage facility, which are accessible to client devices via network 100. For example, PC 140 may access server 120 via network 100. In the embodiment of FIG. 1, DUT 110 communicates with PC 140 on port 111, enabling PC 140 to communicate with server 120.

As the terms are used herein, port 111 of DUT 110 is a client port, which receives data communications from a single client device, in this embodiment PC 140. Port 113 of DUT 110, on the other hand, is a non-client port. As mentioned above, there are potential advantages to network 100 if this classification can be accurately determined. Of course, in some networks the configuration of the various nodes will be known and static, and as mentioned above a client port could be manually designated. In many networks, however, static manual configuration may be impractical.

Returning to the embodiment of FIG. 1, in network 100, DUT 110 is also in communication with router 130, and receives data communications from router 130 on port 112. Router 130 is shown as having three ports, referred to in FIG. 1 as 131, 132, and 133, although again the number of available ports may vary from device to device. As configured here, router 130 communicates with DUT 110 using port 131. Ports 132 and 133 are used to communicate, respectively, with PC 150 and PC 160. As should be apparent, PC 150 and PC 160 may communicate with, for example, server 120 via router 130 and DUT 110.

In accordance with this embodiment of the present invention, each of the ports on DUT 110 may be classified to determine if it is a client port, as is port 111 in FIG. 1, or if it is a non-client port, as are ports 112 and 113. In a preferred embodiment, DUT 110 is arranged to make this determination largely on its own, but in alternate embodiments the determination process may be distributed among several nodes. Note that router 130 may also be arranged to perform dynamic port classification, but for convenience only DUT 110 will be described herein as doing so. A method according to the present invention will now be described in more detail.

Figure 2:
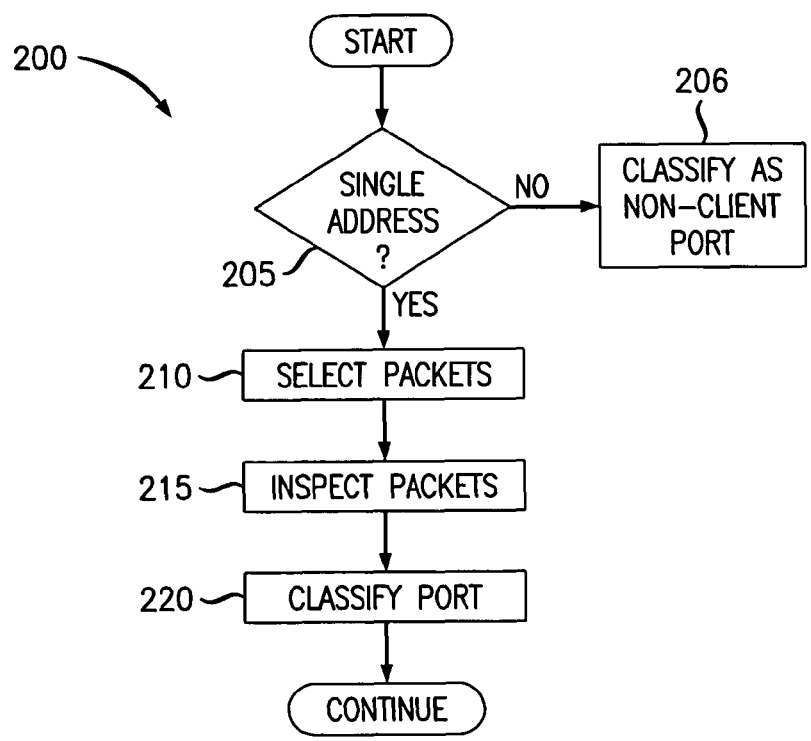
FIG. 2 is a flow diagram illustrating a method of port classification according to an embodiment of the present invention.

FIG. 2 is a flow diagram illustrating a method 200 of port classification according to an embodiment of the present invention. Note that this embodiment will be described in terms of the classification of a single port, for example port 111 on DUT 110, but in most embodiments all ports should be classified unless the classification is already known, and known to be static, or there is some other reason for not performing the classification. At START, it is presumed that the components necessary to performing the invention are available and operational. The method 200 may be initiated in a variety of ways, the most basic being simply receiving an instruction (not separately shown) initiating port classification according to a predetermined schedule. In a preferred embodiment, the instruction is generated by the node itself, although in an alternate embodiment, the node on which the port resides may receive an instruction from elsewhere in the network.

However initiated, the process according to the embodiment of FIG. 2 then begins with monitoring the port to determine whether it is receiving packets from (only) a single address (step 205). In a preferred implementation, the address used is the MAC address, and the determination is made by polling layer 2 hardware access tables. In this embodiment, if the port is receiving packets from a plurality of addresses, it is presumed to be a non-client port and the remaining process is not performed until monitoring produces a different result. If, on the other hand, it is determined that the port is receiving packets from a single address, then packets are selected (step 210) for inspection. The selected packets can then be inspected (step 215), and are classified (step 220) based on the results of the inspection.

The packets selected (step 210) may be of one or more type, as explained below, and the inspection criteria may vary according to the type selected. The selection of packets preferably takes place over a discrete duration, which will herein be referred to as the training period. Each training period may be of a predetermined length, or the period may vary, for example, according to the type of packets being selected or the classification history of the port. In addition, different types of inspection (step 215) may be employed. In an alternate embodiment, the training period may be measured by the number of packets selected.

In one embodiment, packets selected during the training period may be inspected to determine their source IP address. If only a single source IP address is found in all of the selected packets, the port may be assumed to be a client port or, as in a preferred embodiment, at least one additional inspection may be performed. The additional inspection or inspections can increase confidence in the accuracy of the classification. In accordance with this embodiment, these inspections require that certain types of packets be selected for inspection. Note, however, that the need to select one or more types of packets for inspection is not meant to imply a requirement that others may not be selected as well, and any of the selected packets may be inspected in any applicable fashion or simply discarded if they are not needed.

In accordance with the present invention, one type of packets that may be selected for inspection is NetBIOS-DS packets. Any of these packets arriving on the port may be deep inspected to yield detailed identifying information about the host. If this information identifies the source as a client, then the port can be classified (step 220) as a client port. Note that as used herein the term client is intended to broadly include not only PCs (including without limitation desktops, laptops, and notebook computers) but workstations and mobile computing devices as well. If SMB or some other protocol is used in place of Net BIOS, then corresponding packets may be selected and inspected in similar fashion.

In accordance with the present invention, another type of packet that may be selected for inspection is DHCP packets. If these packets are selected, they can be inspected to determine if DCHP Discover or DCHP Request packets are arriving at the port. If so, this tends to indicate that the attached host is a client, and the port may be classified (step 220) accordingly. In accordance with another embodiment of the present invention, more than one or all of these tests may be perform, with the corresponding packets being selected. In addition, other tests may be added to the process as well.

Once the port has been classified, the process continues with waiting for the next instruction that initiates the classification process for the classified port, or for another port. Naturally, assuming adequate capacity, classification for multiple ports may be performed simultaneously.

Figure 3:
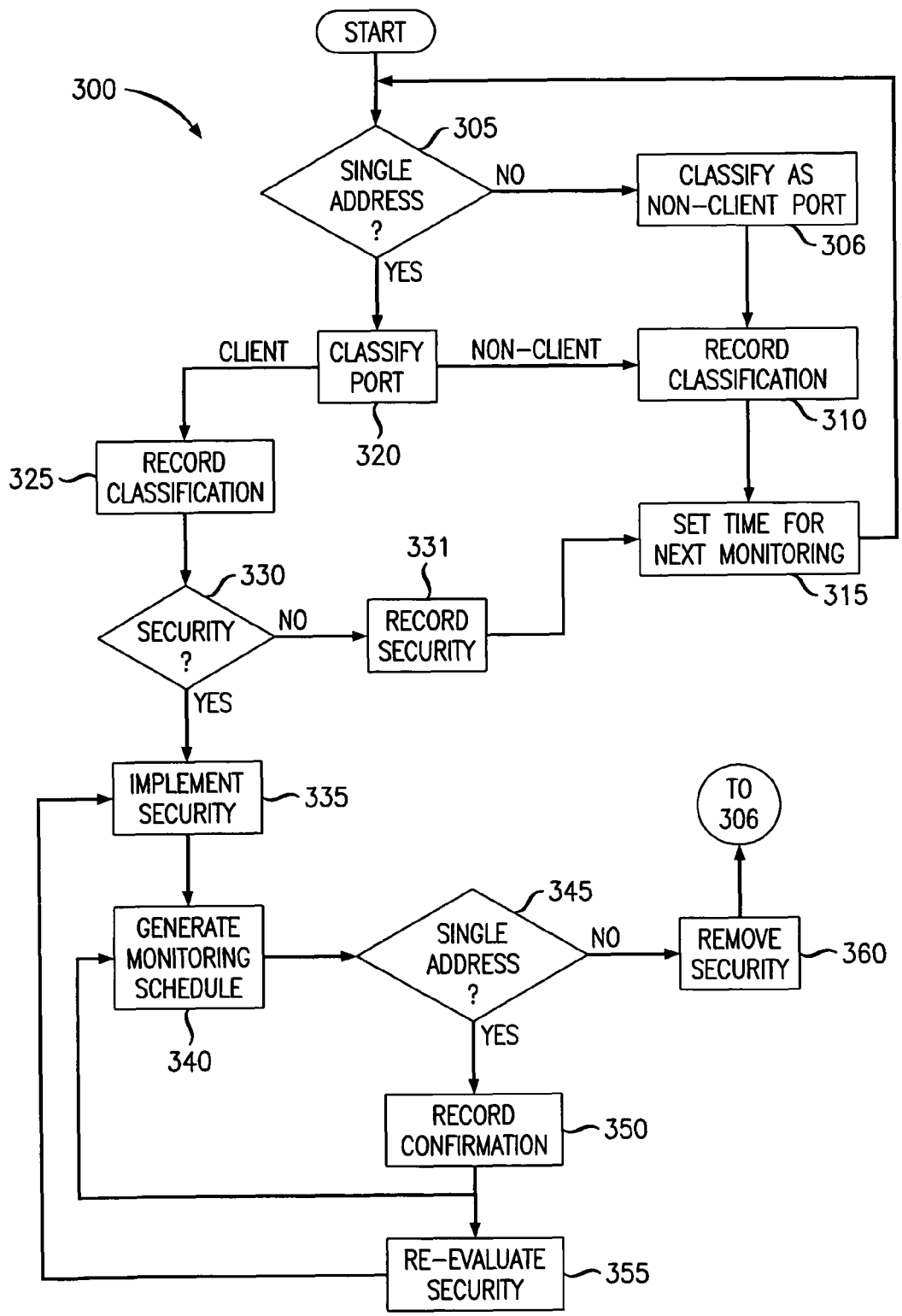
FIG. 3 is a flow diagram illustrating a method of enhancing network security according to another embodiment of the present invention.

In accordance with the present invention, several operations may be performed once the port or ports have been classified. As one example, reference is made to FIG. 3. FIG. 3 is a flow diagram illustrating a method 300 of enhancing network security according to another embodiment of the present invention. At START, it is presumed that the components necessary to performing the invention are available and operational.

Method 300 then begins with monitoring the incoming packet traffic (step 305) to determine if they are being received from a single source address. Again, in a preferred embodiment a determination is made by polling layer 2 hardware tables to determine of the incoming packets on the port have the same MAC address. In the embodiment of FIG. 3, if the incoming packets do not have the same MAC address, then the port is classified as a non-client port (step 306). This classification is recorded (step 310) for possible future use, along, if desired, with any other relevant information such as the reason for the classification or on what it was based. The time (or other event) for initiating the next (pre-classification) packet monitoring is then determined (step 315), and (when it arrives), the process returns to step 305.

If the monitoring at step 305 determines that all of the packets are arriving from a single address, then the port is classified (step 320) by packet inspection. This process is set forth in reference to FIG. 2 and will not be repeated here. Referring to FIG. 3, in this embodiment if the port is classified as a non-client port, the classification is recorded (step 310) and a time is set for initiating the next packet monitoring (step 315). If, on the other hand, the port is classified as a client port, the classification is again recorded (step 325), and a different procedure is followed.

Once the port has been classified as a client port, a determination is made (step 330) as to whether security measures should be applied to that port. Security measures are in some embodiments applied every time such a finding is made, but in other cases additional factors may be taken into account. For example, the classification history of the port may be considered, such as whether the classification of the port frequently changes. A classification confidence factor may also be determined and recorded (step not shown); this factor may also be based on the port's classification history but also on factors such as which type of packet where involved in the inspection and classification process, the length of the training period, and so forth.

If security measures are not to be implemented, this fact may also be recorded (step 331) and a time set for initiating the next packet monitoring (step 315). If, on the other hand, a determination is made at step 330 that security measures are appropriate, then one or more security measures are implemented (step 335) for the (now-classified) client port. (A recording may also be made of this determination (not shown).) Once this is done, a monitoring schedule is generated (step 340). In this embodiment, once security measures are implemented the monitoring schedule is maintained, which may result in more frequent or different monitoring than if the port was classified as a non-client port. Monitoring may alternately or in addition be performed by copying all traffic arriving at the port from a source IP address different from the one originally identified. For example, a TCAM could be implemented in an ASIC programmed to copy all such traffic to a packet inspector or other component. Additional monitoring, or a different schedule for ports classified as client ports, is not, however, a requirement in every embodiment. Returning to the embodiment of FIG. 3, the monitoring determines (step 345) whether the packets being received at the port continue to arrive from a single address. If so, in the embodiment of FIG. 3 this classification confirmation is recorded (step 350), and the security measures in place re-evaluated (step 355). If the classification history indicates that this port has been a client port continuously for a relatively-long period of time, additional security measures may be applied; in other cases some security measures may removed. In some embodiments, the monitoring schedule may also be adjusted (at step 340) or the type of monitoring changed. As should be apparent, in some embodiments neither the security measures nor the monitoring schedule or method need be adjusted at all, or more than once or twice, as long as the port remains classified as a client port.

If, on the other hand, the monitoring at step 345 indicates the incoming packets are not arriving from a single source address, the security measures are removed (step 360), and the process returns to step 306, where the port is classified as a non-client port. In some embodiments, although not shown in FIG. 3, the process may also return to step 360 when a network reconfiguration, or certain type of reconfiguration, is detected.

It should be noted that with respect to the methods illustrated in FIGS. 2 and 3, the exact order of operation is not required unless so claimed in a particular embodiment. Rather, in most implementations, the operations may be performed in any logically-consistent sequence. Also, additional steps may be added, or in some embodiments removed, without departing from the spirit of the invention. In addition, it is noted that in some embodiments, the methods according to the present invention may classify as a client port a port actually in communication with a number of devices, only one of which is active for the relevant periods of monitoring and packet selection, or with a bridge or similar device currently receiving packets only from a single client device. This may pose no disadvantage at all, given that the port may, for the time being, be treated as a client port. Periodic re-classification or additional monitoring should soon identify when this treatment is no longer advised. It is also preferred that the network administrator have the option of disabling operation of the invention for the network or for any given port if desired.

Figure 4:
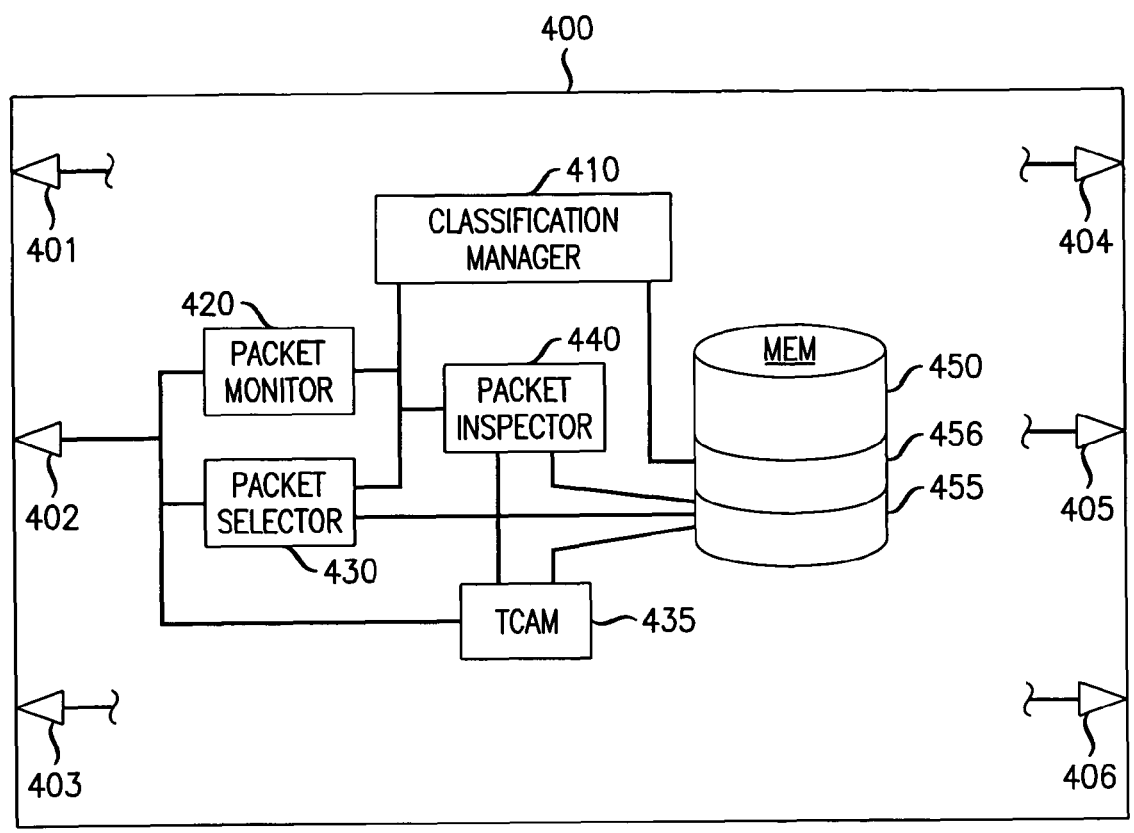
FIG. 4 is a simplified block diagram illustrating selected components of network node, configured according to an embodiment of the present invention.

FIG. 4 is a simplified block diagram illustrating selected components of network node 400, configured according to one embodiment of the present invention. In this embodiment, node 400 has six ports, numbered 401 through 406. Note that while these ports are laid out at either side of node 400 for illustration, no particular layout is required and the ports may be physical or virtual ports. In addition, for clarity only the lines of communication with port 402 are shown; the other ports in this embodiment may be presumed to be similarly connected. In a preferred embodiment, node 400 is a router, though other devices may be able to implement the present invention as well.

In this embodiment, node 400 includes a classification manager 410. Classification manager 410 controls the operation of the classification-related components shown in FIG. 4. For example, classification manager 410, generates instructions initiating port classification, and selects the port or ports to be classified. The packet monitor 420 determines whether the ingress packets on the selected port all are from a single address, such as the same MAC address. Packet monitor 420 may poll layer 2 hardware tables for this purpose. In any event, the monitoring results are reported back to the classification manager 410. If the packets are reported to arrive from a single address, classification manager 410 directs the packet selector 430 to select at least a first type of packets for inspection, and may indicate a specific training period or number of packets to be inspected. When so directed, packet selector 430 selects the packets, which may be temporarily buffered in the inspection buffer portion 455 of memory 450. In an alternate embodiment, the training period or number of packets may unspecified at the beginning and instead be halted by an instruction from the classification manager 410 when enough information has been reported by packet inspector 440 to make a classification of adequate accuracy. Note also that the specified packet type may in some instances include all arriving packets.

The packet inspector 440 performs packet inspection according to the instructions of the classification manager 410, and reports the results, either after the training period or at selected times while the inspection is in progress. Classification manager then classifies the port, and the classification is stored in the classification history portion 456 of memory 450. In some embodiments, the classification manager 400 will then issue instructions for implementing, adjusting, or removing security measures on the port, depending on the classification and, in some cases, the classification history. The classification history may also be used in some embodiments for determining when the next monitoring or selecting instructions are generated.

In the embodiment of FIG. 4, a TCAM 435 is also present, and may be used for additional monitoring according to a monitoring schedule after application of security measures to a port classified as client port. TCAM may, for example, be implemented as an ASIC programmed for this purpose (along with any others for which it is required). In this embodiment, TCAM 435 may perform the additional monitoring by copying any incoming packets (for example, to packet inspector 440 or classification manager 410, or to buffer 455 for their use) with a source IP address different from the source IP address associated with the client associated with classification of the port as a client port. In this manner, the possible necessity for port reclassification may be efficiently identified. In an alternate embodiment, TCAM 435 may also be used in addition to or in lieu of packet selector 430 in selecting packets for inspection prior to classification.

Finally, note that FIG. 4 represents only one embodiment; in other embodiments, the functions of the various components may be differently distributed and, in some cases reside in a different physical component than node 400.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of classifying a port on a node in a data communication network, comprising:
   (a) determining by a packet monitor whether the port is receiving packets from a single MAC (medium access control) address by polling at least one layer 2 hardware table;
   (b) if so, selecting during a defined training period packets of at least a first type from those incoming at the port;
   (c) inspecting the selected packets; and
   (d) determining from the inspection whether the single address corresponds to a client device.

2. The method of claim 1, further comprising terminating the selection of packets for inspection at the conclusion of the defined training period.

3. The method of claim 1, further comprising repeating (a) through (d) after a predetermined interval following the determination of whether the single address corresponds to a client device.

4. The method of claim 1, wherein the first type of packets are NetBIOS-Datagram Service (DS) packets.

5. The method of claim 1, wherein the first type packets are Server Message Block (SMB) packets.

6. The method of claim 1, wherein the first type of packets are Dynamic Host Configuration protocol (DHCP) packets.

7. The method of claim 1, further comprising wherein selecting packets of at least a first type from those incoming at the port comprises also selecting packets of a second type.

8. The method of claim 1, further comprising monitoring of the port following the determination that the single address corresponds to a client device.

9. The method of claim 8, further comprising copying all ingress traffic at the port from an address different from the source IP address associated with the client device.

10. The method of claim 9, wherein the copied traffic is copied by a Ternary Content Addressable Memory (TCAM).

11. The method of claim 1, further comprising selecting at least one security measure and applying the at least one selected security measure to the port if the single address is determined to be associated with a client device.

12. The method of claim 1, wherein (a) through (d) are performed by the node.

13. The method of claim 12, wherein the node is a router.

14. A method of selectively providing enhanced security in a data communication network, comprising:
   (a) determining by a packet monitor whether a network node port is receiving packets from a single IP (Internet Protocol) address;
   (b) if so, selecting incoming packets of at least a first type during a defined training period;
   (c) inspecting the selected packets;
   (d) determining from the inspection whether the port is a client port;
   (e) applying at least one security measure to incoming traffic on the port; and
   (f) monitoring the port following application of the at least one security measure by copying all traffic received at the port from a source IP address that is different from the source IP address associated with determination that the port is a client port.

15. The method of claim 14, thither comprising removing the at least one security measure if the monitoring determines that packets received on the port are from a plurality of source addresses.

16. A network node, comprising:
   at least one port;
   a packet monitor comprising a TCAM (ternary content addressable memory), the packet monitor for determining whether all packets being received on the at least one port are associated with a single source address;

a packet selector for selecting packets for inspection during a defined training period if the packet monitor determines that all packets being received on the at least one port are associated with a single source address;
a packet inspector for inspecting the packets selected by the packet selector; and
a classification manager for classifying the at least one port based on the inspection by the packet inspector.

17. The network node of claim 16, wherein the network node is a router.

18. The network node of claim 16, wherein the classification manager generates an instruction for applying security measures to any port classified as a client port.

19. The network node of claim 18, wherein the classification manager instructs the port monitor to periodically monitor any port to which security measures have been applied.

* * * * *